(No Model.) 8 Sheets—Sheet 1.

A. M. ENGLISH.
MACHINE FOR MAKING BUTTON FASTENERS.

No. 360,004. Patented Mar. 29, 1887.

Fig 1

(No Model.)

A. M. ENGLISH.
MACHINE FOR MAKING BUTTON FASTENERS.

No. 360,004. Patented Mar. 29, 1887.

WITNESSES
INVENTOR
By Attorney (No Model.) 8 Sheets—Sheet 4.

A. M. ENGLISH.
MACHINE FOR MAKING BUTTON FASTENERS.

No. 360,004. Patented Mar. 29, 1887.

WITNESSES
INVENTOR

(No Model.) 8 Sheets—Sheet 5.

A. M. ENGLISH.
MACHINE FOR MAKING BUTTON FASTENERS.

No. 360,004. Patented Mar. 29, 1887.

(No Model.) 8 Sheets—Sheet 6.

A. M. ENGLISH.
MACHINE FOR MAKING BUTTON FASTENERS.

No. 360,004. Patented Mar. 29, 1887.

WITNESSES

INVENTOR (No Model.) 8 Sheets—Sheet 7.
A. M. ENGLISH.
MACHINE FOR MAKING BUTTON FASTENERS.
No. 360,004. Patented Mar. 29, 1887.

(No Model.) 8 Sheets—Sheet 8.

A. M. ENGLISH.
MACHINE FOR MAKING BUTTON FASTENERS.

No. 360,004. Patented Mar. 29, 1887.

WITNESSES
INVENTOR
By Attorney

UNITED STATES PATENT OFFICE.

ANALDO M. ENGLISH, OF BOSTON, MASSACHUSETTS, ASSIGNOR TO THE PRATT MANUFACTURING COMPANY, OF PORTLAND, MAINE.

MACHINE FOR MAKING BUTTON-FASTENERS.

SPECIFICATION forming part of Letters Patent No. 360,004, dated March 29, 1887.

Application filed March 29, 1886. Serial No. 196,887. (No model.)

*To all whom it may concern:*

Be it known that I, ANALDO M. ENGLISH, a citizen of the United States, residing in the city of Boston, county of Suffolk, and Commonwealth of Massachusetts, have invented certain new and useful Improvements in Machines for Making Button-Fasteners, of which the following is a true and complete specification.

My invention relates to a machine for making a fastener for attaching buttons to cloth, leather, or other fabric; and it also consists of the machine hereinafter described.

In the accompanying drawings.

Figure 1:
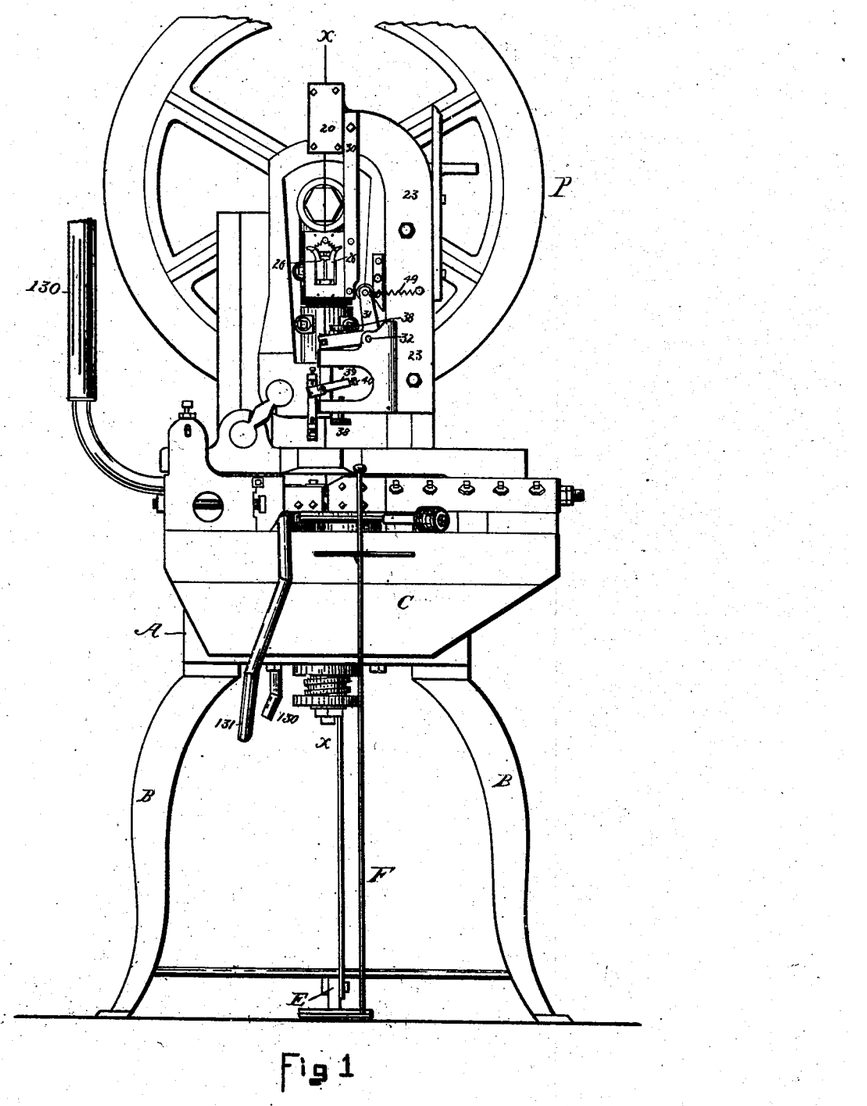
Figure 1 is a front elevation of the machine.
Figure 2:
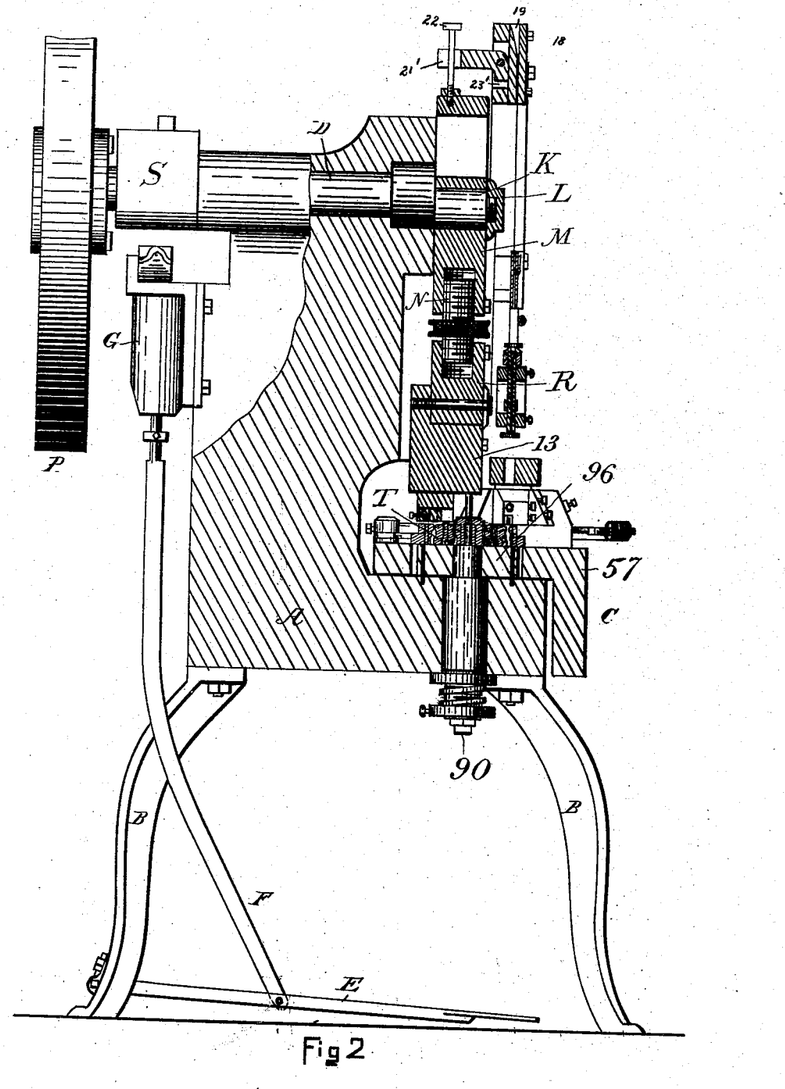
Fig. 2 is a partly-sectional side elevation of the same.

Referring to Figs. 1 and 2, A is the main frame of the machine, and stands upon the legs B B. At the top of the frame A is mounted the arbor D, bearing a crank, K, at the front end and a fly-wheel, P, and clutch S at the opposite end, Fig. 2. The clutch S operates to start and stop the machine through the medium of the spring-buttress G, which receives its motion from the treadle E and connecting-rod F. Power is communicated to the fly-wheel P by a belt, and from the fly-wheel, by means of the clutch S, to the arbor D and crank K, through the rotation of which a reciprocating motion is imparted to the pitman M R, the length of which is adjustable by means of the double screw N. The pitman in turn communicates its motion to the slide or gate 13, to the bottom of which a shoe is attached, which carries the heading-dies and the pins which open and shut the clamping-dies of the turret or dial, soon to be described. Immediately under the gate 13 is mounted upon the anvil 96 the turret or dial T, turning upon the central pivot, 90. This dial contains eight pairs of clamping-dies, which are opened and closed in a manner to be hereinafter described.

Figure 10:
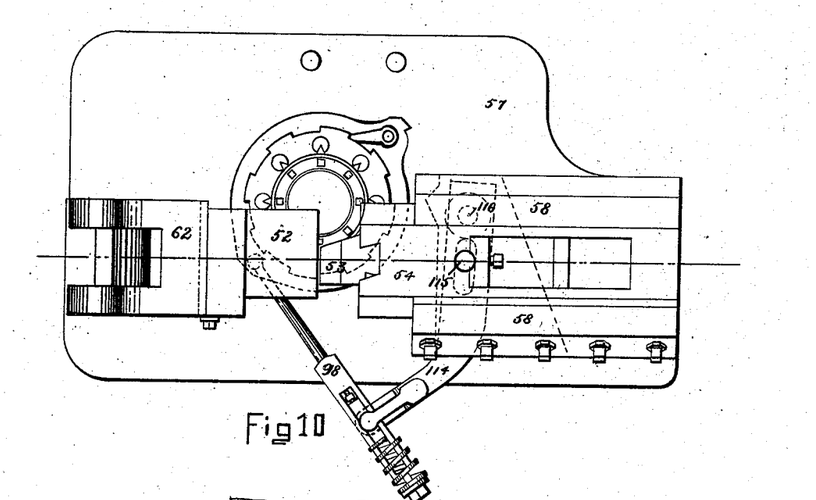
Fig. 10 is a horizontal view of the dial and chucks carrying the swaging and cutting tools and some of the connections of the same.

57 is a supplementary frame secured to A by suitable bolts, and which bears the cross-motion slide 54. This receives a reciprocating motion from the slide 55, which in turn receives its motion from the gate 13, through the medium of the link 56. The slide 54, by means of the pin 115, imparts a vibratory motion to the arm 114, one end of which is held stationary by the pin 116, Fig. 10. The arm 114 in turn, through the medium of the connecting-rod 98, imparts a reciprocating rotary motion to the ring 81, which closely fits around the turret T and turns nicely around it at each forward stroke of the connecting-rod 98, but which, at each return-stroke, by means of the pawl 100, turns the turret one-eighth of a revolution, by engaging the notches 97.

The straightener, tension, and feeding device are carried by a casting, 23, which is bolted to the front of the frame A.

Having now described the general arrangement of the machine, I will follow the material as it is subjected to each successive step in its passage through the machine and minutely describe each part as I come to it.

Figures 3, 4, 5, 6, 7, 8, 9:
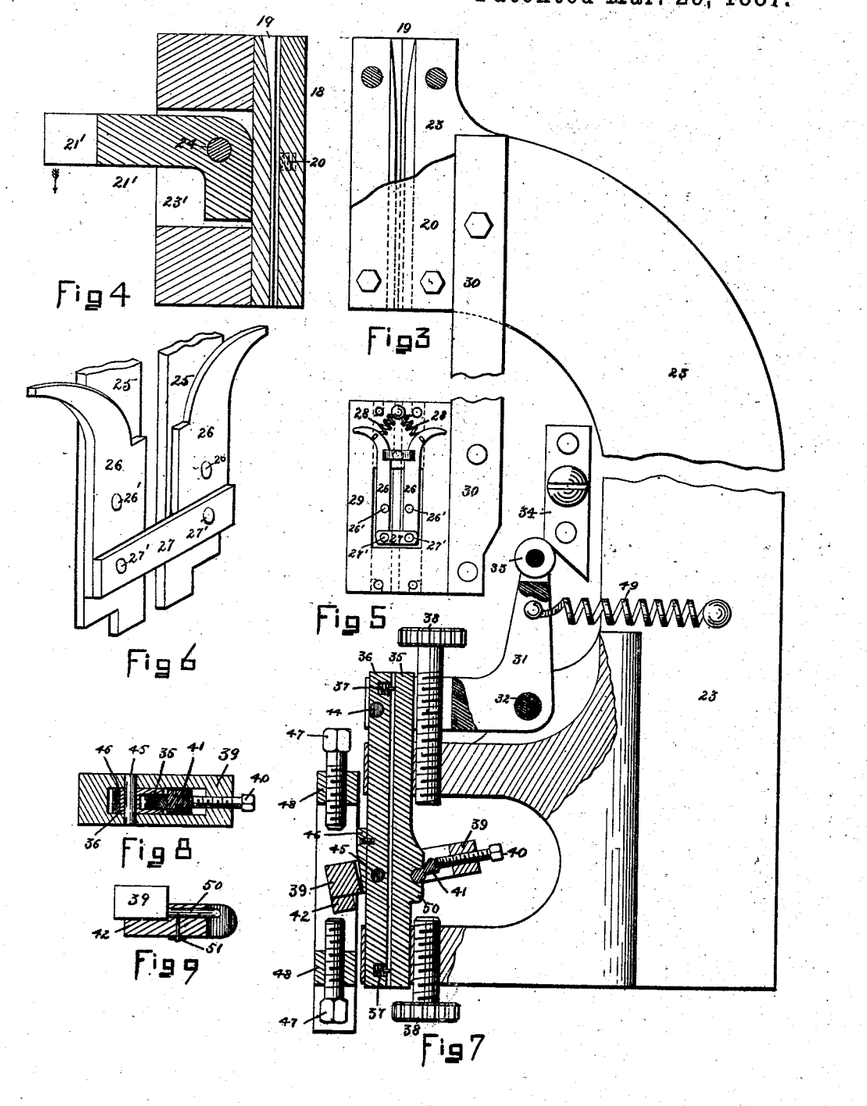
Fig. 3 is a front elevation of the straightening device.
Fig. 4 is a side section of the same.
Fig. 5 is a front elevation of the tension device.
Fig. 6 is a perspective view of part of the same.
Fig. 7 is a front section of the feeding device.
Figs. 8 and 9 are sections of the same.
Figure 26:
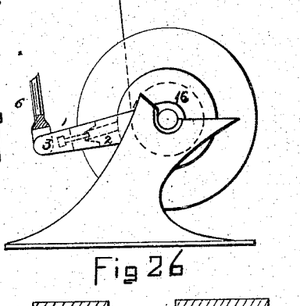

The wire from which the fastener is made is fed into the machine from the reel, Fig. 26. The wire is wound on the drum of the reel; from there passes through a ring at the end of the spring 4, Fig. 24; thence over the wheel 11 and to the machine, to which it is fed by the wheel feeding device. The spring 4 is attached to a rod, 6, provided with a dog, 7, attached to it by means of a ring, 8. To the piece 13, which rises and falls with the press, is attached an arm, 10, which has a slot, 14, at one end of which projects a toothed piece, 9, which, as the press rises and falls, engages the dog 7, and so causes the rod 6 to rise and fall with it. To the piece 13 is also attached a spring, 5, which holds the rod 6 away from the toothed piece 9. The rod 6 is also provided with a spring, 4, through a ring at the end of which the wire 15 is passed, so that as the wire 15 is consumed by the machine it will grow taut and tend to push the rod 6 toward the piece 9 by means of the spring 4, so that when the tension of the spring 4 exceeds that of the spring 5 the rod will be pushed over against the piece 9, which will then engage the end of the dog 7, and the rod will rise and fall with the press. The lower end of the rod is attached to an arm, 1, which is free to revolve around the axis of the reel 16. This arm is provided with a dog, 2, adjusted by a screw, 3. This takes hold on a friction-wheel, 17, which is firmly attached to and revolves with the reel. The point of contact between the dog and reel being above the line connecting the center of the reel with that of the pivot of the dog, when the arm 1 is moved up the dog takes hold and the reel turns with it; but when the rod is moved down the dog slides on the friction-wheel and does not take hold. So the up-and-down motion of rod 6 pays out the wire from the reel, and as soon as the wire is slack the dog 7 no longer engages with the toothed piece 9, and the wire is no longer paid out from the reel. The wire passes over the wheel 11 and thence through the straightening device, Figs. 3 and 4. This consists of a piece, 19, which has a groove running through it from end to end, through which the wire passes. This piece fits into a slot in the cast-iron frame 23, as shown in Fig. 3, and is covered in front by the plate 18, which is secured by four screws. The plate 18 is shown in Fig. 3 partly broken away to show the piece 19. The groove in 19 is wider at the top than at the bottom, so that a crooked piece of wire may enter at the top. There is a small space, three sixty-fourths of an inch, between 19 and 18, and they are kept apart by the spring 20. The casting 23 is cut away behind at 23' to receive the lever 21, which rotates on the pin 24. A bolt, 22, secured to the top of the reciprocating piece 13, as shown in Fig. 2, serves to vibrate the lever 21 as the press rises and falls, and by pinching the wire between 18 and 19 straightens it.

From the straightening device the wire passes to the tension device, which serves to keep it taut, so that it may be fed regularly to the machine. The wire is held between two parallel pieces, 25, Fig. 6. In front of these are riveted the curved pieces 26 by the rivets 26'. To these in turn is riveted the piece 27, Fig. 6, so that when the pieces 26 are drawn together by the springs 28 the wire will be grasped between the pieces 25 with a grip proportional to the strength of the springs 28. The whole is inclosed in an appropriate frame, 29, and attached to the frame by the bar 30. The spreading-screw 43 serves to release the tension when it is not wanted. From the tension device the wire goes to the feeding device, Figs. 7, 8, and 9.

The piece 36 is provided with a slot to receive the piece 35, which has a notch in its front side, which receives the wire, as shown in Fig. 8. 35 and 36 are held apart by the springs 37, so that unless they are squeezed together they will allow the free passage of the wire. The piece 36 is connected at its upper end to a bent lever, 31, by the pin 44. This lever is free to rock around the pin 32, and at its upper end is provided with an anti-friction wheel, 33. It is also provided with a spring, 49, the other end of which is attached to the frame 23, so that the lower end of the lever returns to its highest position when not acted upon by the other parts of the machine. The lever is moved by the cam 34, which is screwed and doweled to the reciprocating piece 13, and consequently rises and falls with the press, so that when the press falls the piece 36 falls also, but not so much as the press, nor does it start as soon as the press nor continue so long, for the downward motion of the piece 36 continues only while the inclined face of the cam 34 is acting on the bent lever 31. The piece 35 has a projecting part, 50, which is bored to receive the cylindrical head of the link 41. To the piece 36 is attached the dog 39 by the pin 45. The motion of this piece is limited by the cam 46, screwed to the back of 36. The dog 39 can revolve from a little past the horizontal position (which is one extreme position) to the position shown in Fig. 7, which is the other extreme position.

Figure 11:
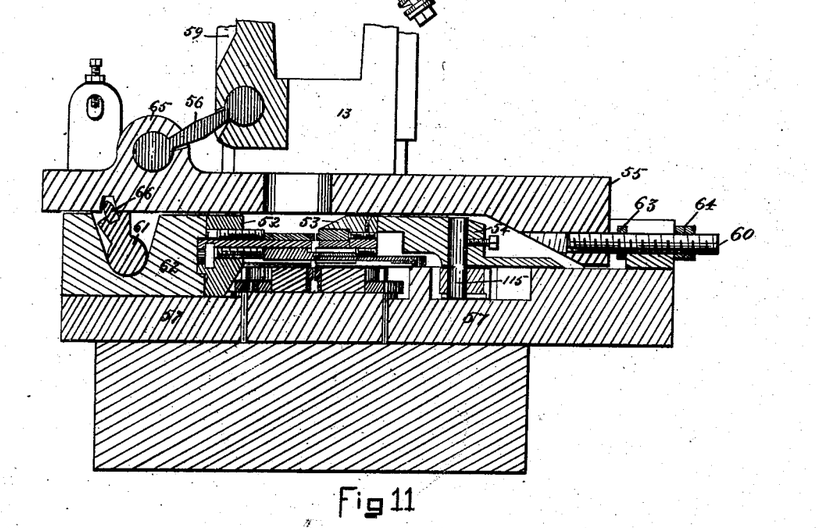
Fig. 11 is a front section of the same on line X X.
Figure 12:
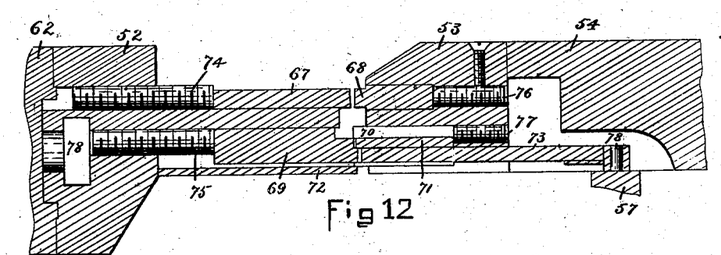
Fig. 12 is a front section of the chucks and the cutting and swaging tools.
Figure 13:
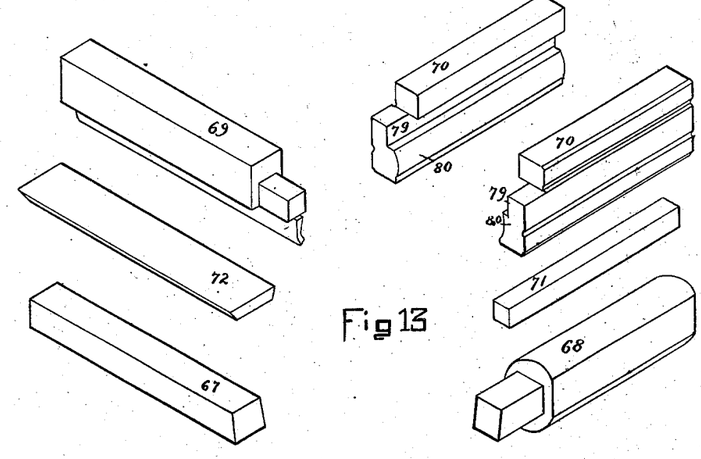
Fig. 13 is a detail view of the cutting and swaging tools.
Figures 14, 15, 16:
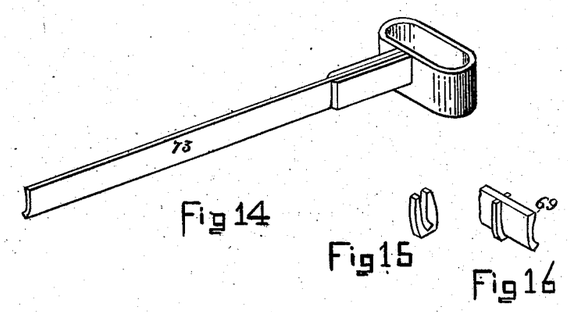
Fig. 14 is a perspective view of the ejector.
Fig. 15 is a view of the scrap cut from the wire in forming the shank of the fastener.
Fig. 16 shows the scrap in place on the cutting-tool.
Figure 17:
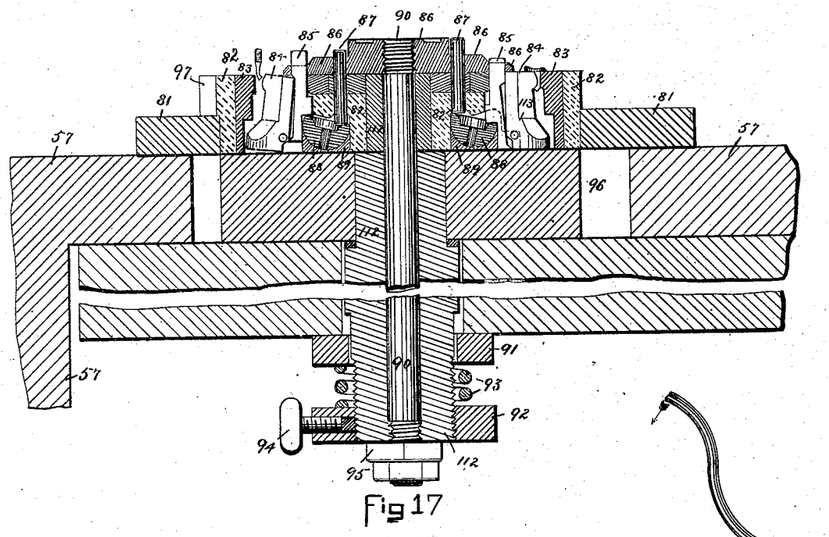
Fig. 17 is a side section of the dial and its connections.
Figure 18:
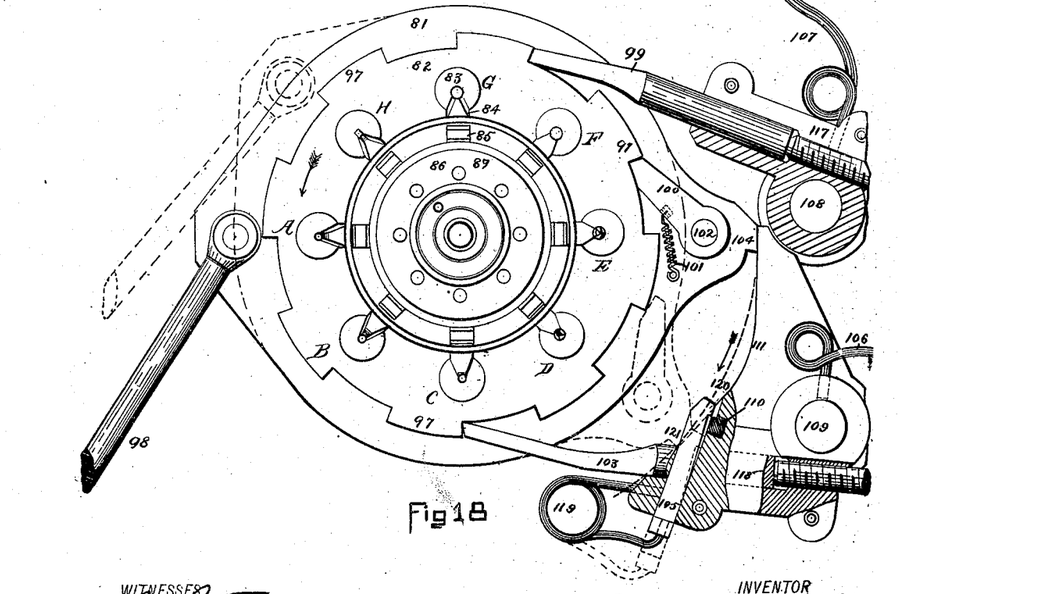
Fig. 18 is a top view of the dial, ring, and pawls for turning, arresting, and locking it in position.
Figure 19:
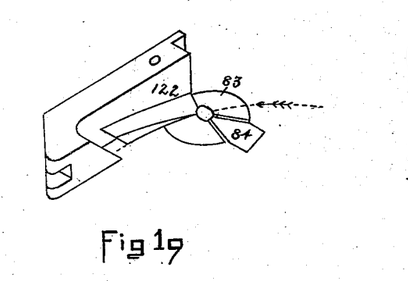
Fig. 19 is a perspective view of the device for removing the finished fastener from the dial.
Figure 20:
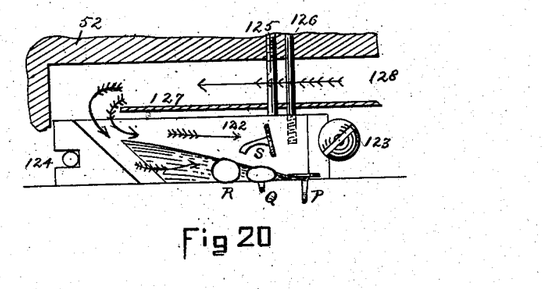
Fig. 20 is a side section of the same.

The dog 39 is arranged to embrace the parts 35, 36, 41, and 46, as shown in Fig. 8, and is provided with a screw, 40, the end of which fits into the conical end of the link 41. When the dog 39 is in a horizontal position and the pin 45, the link 41, and screw 40 are in line, the pieces 35 and 36 are closed tightly on the wire. This is the case when the pieces 35 and 36 are moving down. When the dog 39 is in the position shown in Fig. 7, the space between the pieces 35 and 36 is open and the wire passes freely. This is the case during the upward motion of the pieces 35 and 36. The piece 48 is attached to the reciprocating piece 13, and consequently rises and falls with the press.
This piece is provided with two screws, 47. The upper screw is so adjusted that when the pieces 48 and 36 are at their lowest position, and the piece 39 in the position shown in Fig. 7, the end of the screw will be in contact with the piece 39. The lower screw is so adjusted that when the pieces 36 and 48 are in their highest position, and the dog 39 is in a horizontal position, the end of the lower screw will be in contact with the piece 42. The piece 42 is attached to the piece 39 by the pin 50, along which it may slide to the right, Fig. 9. It is provided with a spring and dog, 51, which fits into notches in the pin 50, and so holds it in either position, (the outer or inner.) The action of the feeding device is as follows: The dogs being in the position shown in Fig. 7, and the pieces 47 and 36 in their lowest position, the press begins to rise, and with it the pieces 34 and 48. The rise of 34 releases the bent lever 31, which moves by the power of the spring 49, the parts 36 and 35 rising with it. The dog 39 being in the position shown in Fig. 7, the slot between 35 and 36 is open, and the rising of 35 and 36 does not move the wire; but 35 and 36 complete their upward motion before that of the press, which continues to rise, carrying with it the piece 48 and the lower screw, 47, which strikes against the lower part of 42 and moves 39 into a horizontal position, which closes the slot between 35 and 36 upon the wire. When the press now commences its downward motion, the cam 34 moves the upper end of the bent lever 31 to the left, and the parts 35 and 36 descend and carry with them the wire. At the end of the stroke the upper screw 47 strikes the upper side of 39 and returns it to the position shown in Fig. 7. Thus the wire is fed evenly into the machine.
To prevent jars and adjust length of feed, two screws, 38, are provided. The head of the upper one touches the upper end of 36 when in its highest position, and the head of the lower one touches the lower end of 36 when in its lowest position.
From the feeding device the wire passes to the swaging and cutting tools. The tools are contained in two chucks—the stationary chuck 52, Fig. 10, and the moving chuck 53. The moving chuck is carried by the sliding piece 54, which slides in the guides 58, which are a part of the main bed-casting 57, Fig. 10. The sliding piece 54 is moved by the piece 55, to which it is attached by means of the screw 60 and the nuts 63 and 64, Fig. 11. The piece 55 has a projection, 65, which is bored out to receive one head of the link 56. The other head of the link 56 is held in a similar manner by a projecting lug, 59, on the reciprocating piece
13. Therefore, when the press falls the piece 60 moves to the left, carrying the sliding piece 54 and the chuck 53 with it, and so bringing the tools together, and when the press rises the parts move to the right and the tools are separated. One end of the piece 55 is supported by the sliding piece 54. To support the other end a link, 61, is used, which is provided with a tooth, 66, which engages a corresponding notch in the piece 55. These surfaces must be so arranged that they will roll on each other and not rub, as the slightest rubbing would produce a wear which would tend to throw the machine out of adjustment. The link 61 rotates in a recess in the casting 62, provided for it. The tools consist of the swaging-tools 67 and 68, Figs. 12 and 13, the tools for cutting the shank of the fastener out of the flattened wire 69 and 70, Figs. 12 and 13, and the tool for cutting the unfinished fastener off from the wire 72. There is also an extractor, 73, Fig. 14, and a piece, 71, which serves to fill up a space between the two pieces 70. The wire as it passes down first comes to the swaging-tools, where it is flattened out a little, as shown in a and b, Fig. 27.
The swaging-tools are held in the chucks 52 and 53, each in appropriate slots provided for them. They are adjusted, respectively, by the screws 74 and 76, and are slightly sloping on the end, so that their lower edges are a little nearer than their upper edges.
From the swaging-tools the wire passes to the cutting-tools, for cutting out the shank of the fastener. These consist of the male tool 69 and the female tools 70. The female tools are in two pieces, for convenience. The said female tools are put together with the piece 71, filling the space 79, which it accurately fits. This serves to keep the tools in correct relative positions. The male tool enters slightly into the female to make a clean cut. The extractor occupies the space 80 in the female tool, and is fastened by the pin 78 to the bedplate 57. It is consequently stationary, and as the tools move back prevents the fastener from sticking in the retiring tools.
The piece 72, (shown in position in Fig. 12,) serves to cut off the unfinished fastener from the wire. This is done at the same motion with the operation explained last, so that the scrap cut off is of the shape shown in Fig. 15. The scrap remains on the male tool and slides, when pushed by succeeding pieces, toward the back end of the tool, where it is disposed of in a manner to be hereinafter described.
In Fig. 12 is shown the manner in which the chuck 52 is secured to the casting 62 by the screws 78. The unfinished fastener being cut off from the wire, sinks into an open die of the dial, which is directly beneath it, Fig. 17.
The mechanism of the dial, Figs. 17 and 18, is as follows: The dial consists of a frame, 82, (provided with lugs 97, by which it is moved,) containing the dies and the mechanism for opening and closing them. This is best shown in the section, Fig. 17. 83 is the female die and 84 the male die. The female die is driven firmly into the frame, while the male die is movable. The die is held in position, either closed or open, by the piece 85, which rests on the front edge of a half-ball, 88, which moves in its socket 89. On the back edge of the said ball rests a pin, 87, so that when this pin 87 is depressed the piece 85 rises. The shape of the male and female dies are such that in opening the die the male die revolves about the edge 113, Fig. 17, so that in the elevation of the piece 85 the inclined surfaces at its bottom press against the back of the male die 84 and tend to force it forward, while the inclined surface at the upper end recedes and allows the die to open, as shown at the left, Fig. 17. When the piece 87 is depressed, the piece 85 rises, and the die opens, and, vice versa, when the piece 85 is depressed the die closes. The dial rests upon the anvil 96, which in turn rests upon the bed of the machine, and is secured by the piece 112 and the bolt 90. The piece 112 is provided at its lower end with two rings, 91 and 92. The lower one, 92, is screwed firmly to the piece 112, and further secured by the set-screw 94. The upper ring, 91, is loose. Between the two rings is a spring, 93. The piece 112 passes up through the bed of the machine and the anvil and dial, as shown in Fig. 17. Through its center is passed the bolt 90, the upper end of which is firmly screwed into the upper plate, 86, of the dial. At its lower end it is provided with a nut, 95, by which the dial, anvil, and piece 112 are firmly fastened together. The parts being in position, the ring 92 is screwed up on the piece 112 until the spring 93 is considerably compressed. By this means the dial is held firmly down to its place, and yet has movement enough to allow it to revolve freely. The dial is surrounded by a ring, 81, Fig. 18, which is connected by the arm 98 to the end of the lever 114, Fig. 10. This lever is connected firmly to the bed-plate by the pin 116 and to the sliding piece 54 by the pin 115, which fits into a slot cut into the said sliding piece, so that the reciprocating motion of the piece 54 gives rise to an oscillating motion in the lever 114, which is communicated by the arm 98 to the ring 81, and serves to revolve it alternately backward and forward. The ring 81 is provided with the pawl 100, connected to it by the pin 102 and held by the spring 101, which is also connected to the ring, so that when the ring revolves to the right the pawl slips over the next notch, and carries the dial with it on being revolved to the left. It is so arranged that the dial shall revolve through an angle of fifty-four degrees at each revolution. The dial contains eight dies, and consequently one die is always in position to receive the unfinished fastener.

Figures 24, 27, 28, 29, 30:
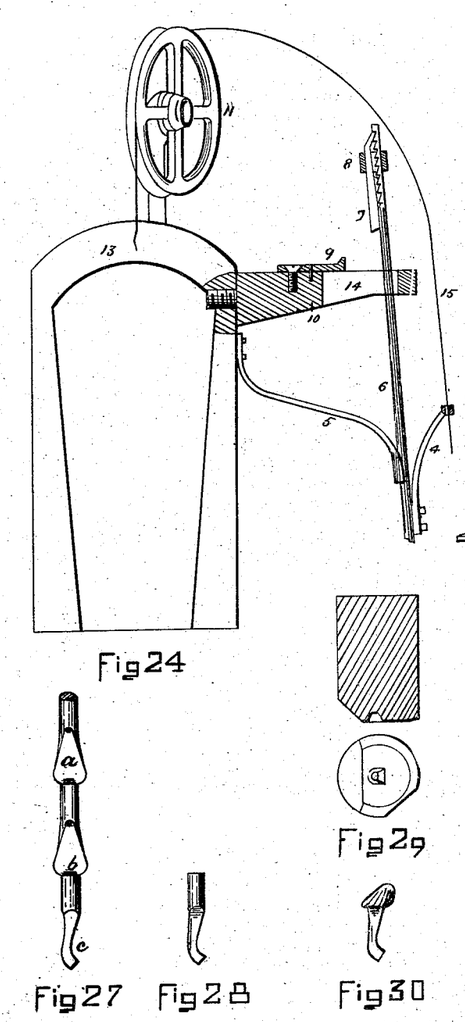
Figs. 24, 25, and 26 show the reel motion which feeds the wire to the machine.
Fig. 27 shows the end of the wire after passing between the swaging and cutting tools.
Fig. 28 shows the unfinished fastener cut off from the end of the wire and ready to sink into the dial.
Fig. 29 is a section and face view of the first heading-die.
Fig. 30 shows the unfinished fastener after being struck by that die.
Figure 25:
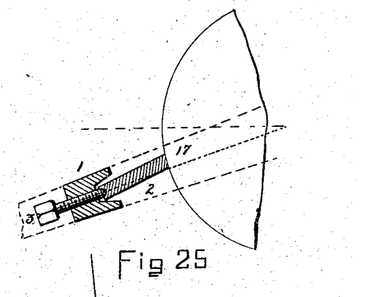
Figure 31:
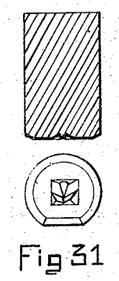
Fig. 31 is a sectional and face view of the second heading-die.
Figure 32:
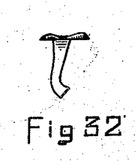
Fig. 32 shows the unfinished fastener after being struck by that die.
Figure 33:
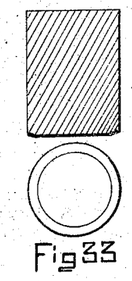
Fig. 33 is a section and face view of the third and last heading-die.
Figure 34:
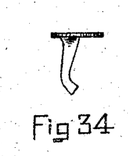
Fig. 34 shows the finished fastener.

In addition to the moving pawl 100, the dial is provided with two retaining-pawls, 99 and 103. These pawls move, respectively, on the pins 108 and 109, and are provided with springs 107 and 106, which are attached to the bed-plate of the machine, 57. They may be adjusted in length by the screws 117 and 118, so as to hold the dial without shaking on its part. The pawl 99 keeps the dial from moving backward and 103 from moving forward. It is therefore necessary to provide some device to disengage the pawl 103 as the dial begins to turn at each stroke of the machine. This is done as follows: The pawl is provided with a dog, 105, which is held in place by the spring 119, which is attached to the bed-plate of the machine, 57. The dog is provided with a notch, 120, which may engage with a steel piece, 110, let into the pawl. Now, as the ring 81 revolves to the right the cam 104 travels in the direction of the arrow along the dotted line, Fig. 18. When it reaches the dog 105, it pushes it back into the position shown by the dotted lines and goes past, while the dog returns to its original position by means of the spring 119. When, however, the ring starts back and the cam presses on the long face of the dog 105 at 121, the notch 120 takes hold of the piece 110 and prevents the dog from sliding, and the pressure consequently throws out the pawl 103. The dial is then free to revolve. The unfinished fastener falls into the die in the position A, Fig. 18. When the machine has made two strokes and the fastener arrives at the point C, the die is closed by a pin attached to a shoe on the bottom of the reciprocating piece 13, which forces down the piece 85, Fig. 17, and so closes the die. In the positions D, E, and F the unfinished fastener is struck successively by the three heading-dies. In the position G the die is opened by a pin from above, and the finished fastener is removed from the dial. Figs. 29, 31, and 33 show the three heading-dies, which are fastened in a shoe at the bottom of the reciprocating piece 13, and Figs. 30, 32, and 34 show the appearance of the fastener after being struck by each.

Figures 21, 22:
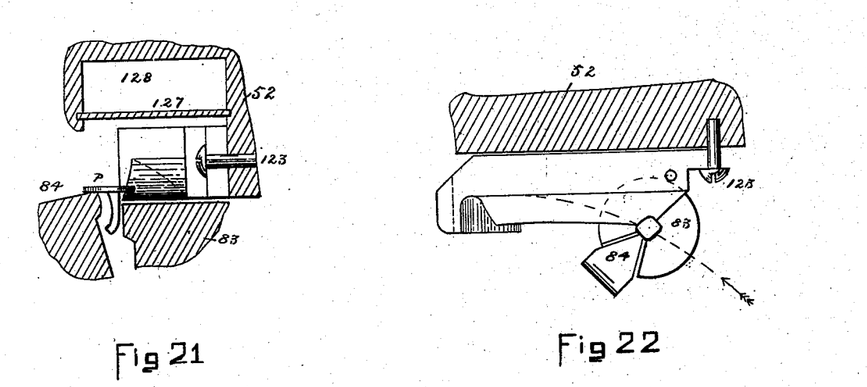
Fig. 21 is an end view of the same, showing the fastener at the beginning of the operation of removing.
Fig. 22 is a horizontal view of the same.
Figure 23:
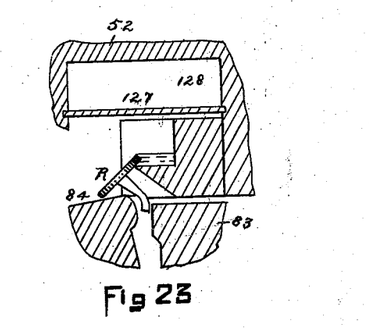
Fig. 23 is an end section of the same, showing the fastener partially removed.

Figs. 19, 20, 21, 22, and 23 show the fastener-ejecting device and the method by which the finished fastener is removed from the dial and finally disposed of. As the dial revolves in the direction of the arrow, Fig. 19, the edge of the ejecting device 122 passes under the edge of the fastener and lifts it successively into the positions P, Q, and R. At the point R it is free from the die, and a strong blast of air blowing in the direction of the arrows, Fig. 20, catches under the head of the fastener and blows it out, as shown at S, and finally into the tube 130, Fig. 1, which deposits it in the proper receptacle. Fig. 21 shows a front view of the ejecting device with the fastener in position P. It will be noticed that with the die open the male die stands a little higher than the female, and so facilitates the passage of the ejecting device under the head of the fastener. Fig. 23 shows the same with the fastener in position R. The ejecting device is contained in the lower part of the chuck 52. The scrap having traveled to the back end of the male cutting-tool 69 falls off, and is blown in a similar manner into the tube 131, Fig. 1.

Having now fully described my invention, what I desire to claim and secure by Letters Patent is—

1. The combination of a reel to whose axis is pivoted an arm having a dog, one end of which is pivoted on a screw and whose other end engages with a cylindrical surface cast on said reel, a rod provided with a dog having attached to it a spring whose outer end is provided with a wire-holding ring, and a reciprocating gate or slide provided with a spring and arm having a slot and a toothed piece, whereby wire is automatically fed at a proper tension from the reel, substantially as described.

2. In combination, two flat pieces, one of which is provided with a wire-pinching slot, said slot being enlarged at one end and said flat pieces being held apart by springs, and a rocking lever which forces said pieces together, whereby wire is pinched and straightened, substantially as described.

3. A spring-tension device consisting of two parallel wire-holding pieces, in combination with two curved levers pivoted to said wire-holding pieces, the short arms of said levers being connected and their long arms being drawn together by springs, whereby the wire is gripped between said wire-holding pieces with a tension proportional to the power of said springs, substantially as described.

4. A wire-feeding device consisting of a reciprocating piece slotted to receive a piece having a wire-pinching slot, said pieces being held apart by springs, and essentially composing a wire-gripping device, which rises and falls a distance exactly equal to the length of wire-feed desired, and which has a vise-closing revolving dog pivoted to said reciprocating piece, and an elbow-joint link and adjusting-screw, said link being pivoted at one end on said adjusting-screw and its other end engaging with said wire-pinching slot-piece, whereby said dog being revolved into its horizontal position closes said wire-pinching vise upon said wire, and being revolved back into its inclined position releases said wire, the said dog being revolved and the said wire gripping vise being closed at the upper end of the stroke of said reciprocating piece, and said dog being reversed and said wire-gripping vise being opened at the lower end of the stroke of said reciprocating piece, whereby an exact length of said wire is fed into the machine, substantially as described.

5. In a machine for making button-fasteners, a tension device and feeding device, in combination with a pair of swaging-tools having their faces slightly inclined to each other, one mounted on a stationary frame, and the other mounted on a sliding gate, whereby the wire is swaged, substantially as shown and described.

6. In a machine for making button-fasteners, a male cutting-die having a uniform section throughout, said section being that of the tang of one of said button-fasteners, in combination with a pair of female cutting-dies having between them a recess corresponding to the cutting portion of said male die, an extractor which remains stationary while said dies reciprocate, thereby preventing the unfinished fastener from sticking in the die, and a straight cutting-tool which cuts off said unfinished fastener, the said male cutting-die receiving and carrying the scrap to its rear end, whence it drops into a proper receptacle, substantially as described.

7. The combination of a revolving dial or turret provided with a surrounding and closely-fitting ring having a cam-faced projection and a pawl engaging with teeth or notches on the periphery of said dial, said pawl having a spring whereby, when said ring is revolved in one direction, said dial will revolve with said ring, and when said ring is revolved in the opposite direction said pawl will slip over said notches in said dial and said dial will remain stationary, a retaining-pawl having a spring and engaging with said notches in said dial, whereby said dial is prevented from revolving backward, and a second retaining-pawl provided with a spring and engaging with said notches in said dial, whereby said dial is prevented from revolving forward, said second retaining-pawl having a toothed pawl-disengaging dog contained in a recess thereof and provided with a spring, whereby said ring being revolved backward said pawl-disengaging dog recedes into said recess and so allows said cam-faced projection on said ring to pass, and said ring being then revolved forward, said cam-faced projection presses against the inclined face of said pawl-releasing dog and said tooth on said dog takes hold of a notch on said pawl and holds said dog firmly in position, whereby the cam-faced projection on said ring disengages said second retaining-pawl from the teeth or notches on the periphery of said dial, and so allows said dial to revolve, substantially as shown and described.

8. A holding-die consisting of a female die having a wedge-shaped recess fitting closely to a male die, which co-operates with it, said dies fitting closely to the object to be held between them, in combination with a cam-faced die-closing dog resting on the front edge of a half-ball, which rocks in a corresponding socket and whose rear edge supports a die-opening pin, whereby said cam-faced die-closing dog being depressed said cam-faces on said dog press against the back of said male die and so close it, at the same time depressing the front edge of said half-ball, whereby its rear edge and said die-opening pin are raised, and said die-opening pin being then depressed the front edge of said half-ball and said die-closing dog are raised, and so the said die is opened, substantially as described.

9. In a machine for making button-fasteners, the combination of the three heading-dies, Figs. 29, 31, and 33, and the turret, whereby the head of the fastener is formed, substantially as shown and described.

10. In a machine for making button-fasteners, the combination of a die-carrying turret, a holding-die, and a fastener-extractor consisting of a wedge-shaped body having an inclined and curved fastener-extracting edge which is inclined inward to the path of revolution of the said turret, whereby said turret being revolved said fastener-extracting edge engages with the under side of the head of the fastener in said die and so lifts and removes said fastener from said die, substantially as shown and described.

11. In a machine for making button-fasteners, in combination, a reel-feed whereby the wire is fed from its reel to the machine, a wire pinching and straightening device, a spring-tension, a feeding mechanism, whereby a known length of said wire is constantly fed to the machine at each stroke, swaging and cutting tools, whereby the said wire is cut into suitable lengths and the tang of the unfinished fastener is formed, a revolving turret or dial held in any desired position, said turret being provided with dies to hold said unfinished fastener in its desired position, said dies being opened and closed at the proper point in the revolution of said dial, a series of heading-dies, whereby the head of said unfinished fastener is formed, and an extracting device, whereby the finished fastener is lifted and removed from the die, the whole being mounted on a suitable frame, substantially as described.

In witness whereof I have hereunto set my hand.

ANALDO M. ENGLISH.

Witnesses:
WM. B. H. DOWSE,
CHAS. L. FITCH.